United States Patent [19]

Birnbaum et al.

[11] Patent Number: 4,575,766
[45] Date of Patent: Mar. 11, 1986

[54] PROCESS AND APPARATUS FOR FORMING MULTIPLE ELECTRONIC IMAGES ON A PHOTOSENSITIVE SURFACE

[75] Inventors: Martin Birnbaum, Paris; Richard Uriet, Sucy en Brie, both of France

[73] Assignee: Elscint, Inc., Boston, Mass.

[21] Appl. No.: 501,884

[22] Filed: Jun. 7, 1983

[30] Foreign Application Priority Data

Jun. 11, 1982 [FR] France ................. 82 10213

[51] Int. Cl.⁴ ............................................. H04N 5/84
[52] U.S. Cl. .................................... 358/244; 369/121; 369/125; 354/76
[58] Field of Search ................. 358/244, 111, 335, 22, 358/345; 354/76; 360/35.1; 364/414; 369/101, 121, 125

[56] References Cited

U.S. PATENT DOCUMENTS

| | | | |
|---|---|---|---|
| 2,728,876 | 12/1955 | Varela . | |
| 4,096,530 | 6/1978 | Plugge et al. | 358/244 |
| 4,130,834 | 12/1978 | Mender et al. | 360/35.1 |
| 4,134,128 | 1/1979 | Hurst | 358/22 |
| 4,172,264 | 10/1979 | Taylor et al. | 358/22 |
| 4,174,895 | 11/1979 | Fermaglich et al. | 354/76 |
| 4,240,729 | 12/1980 | Barney | 354/76 |
| 4,339,769 | 7/1982 | Fujita et al. | 358/244 |

FOREIGN PATENT DOCUMENTS 1915999 10/1969 Fed. Rep. of Germany .
1163919 9/1969 United Kingdom .

*Primary Examiner*—Donald McElheny, Jr.
*Attorney, Agent, or Firm*—Sandler & Greenblum

[57] ABSTRACT

A system is provided for transferring a series of images which are displayed successively on a screen of a video monitor using optical means, onto a photosensitive surface by juxtaposing successive elemental images to form a unique composite image. The composite image is directly created on the screen of the video monitor without the necessity of translationally displacing the various elements relative to one another to achieve the framing or to vary the magnification ratio. The composite image is created by successively sweeping various portions of the screen of a high-definition tube. The amplitude and the centering of the sweep signals are determined, as a function of the selected format, by converters run by programmable memories.

12 Claims, 13 Drawing Figures

PROCESS AND APPARATUS FOR FORMING MULTIPLE ELECTRONIC IMAGES ON A PHOTOSENSITIVE SURFACE

TECHNICAL FIELD

The present invention relates to a process and apparatus for forming a composite image on a photosensitive surface based upon a series of elemental images formed successively on the screen of a cathode tube. Such a technique can, for example, be used to recopy a plurality of electronic images obtained successively on a video monitor onto a single film.

BACKGROUND

A technique for forming a composite image on a photosensitive surface based upon a series of elemental images formed successively on the screen of a cathode ray tube is particularly useful in the medical domain to regroup onto a single film several distinct views relating to a single examination. This is the case, for example, with images obtained electronically by scanners, nuclear medicine apparatus or ultrasound apparatus. The difficulty lies in preserving high image quality (when it is desired, for example, to locate tumors of small dimensions) without any reduction in quality due to transposition.

This transposition or transfer of the electronic image onto a reduced zone of a photosensitive surface such as a film, has been achieved by apparatus known as "multi-imagers" where the image of the cathode tube is projected onto a film by an optical system. The composition of different views on the film has been obtained by relative translational movements between the tube, the film and the optical system, in a manner so as to place the screen image projected on the film onto the zone of the film which must be imprinted.

In such systems, when it is desired to produce compositions having variable formats (particularly to vary the total number of views registered on the film), this can be achieved either by changing the screen-optical-film distances to modify the reduction or magnification ratio, or by employing several different optical foci selectively placed in the optical trajectory as a function of the desired format.

A first series of disadvantages of such apparatus results from the presence of moving parts. The machining precision must be very high, a factor which considerably increases the costs of manufacture. In effect, the positioning must be performed with a precision down to several tens of microns; furthermore, play can rapidly appear with time, thereby diminishing this precision.

Furthermore, the repeated movements of the various parts cause, particularly for multi-format apparatus, poor reproduction of the results.

In a patent application entitled "Electronic Multi-Imager Device" invented by D. Inbar, filed on Oct. 19, 1983, bearing Ser. No. 543,043, U.S. Pat. No. 4,514,072, and assigned to the assignee of this application a multi-imaging device is disclosed wherein the optical components remain stationary and individual images on a cathode ray tube screen of a video system are positioned electronically. Basically the positioning is accomplished by delaying the image producing data for desired time spans following horizontal and/or vertical sync pulses. Varying the rate of supplying the image data to the video tube varies the size of the image. While the device of that application represents a vast improvement over the mechanically operated optical systems of the prior art multi-imaging devices, the electronic system described is not the only way of obtaining multi-images without there being movement between the components of the optical system.

It is therefore an object of the present invention to provide a process and apparatus for forming multiple electronic images on a photosensitive surface which also substantially overcomes the above-described deficiencies in the prior art and which has no moving parts and allows for the multiplication of the formats while, nevertheless, preserving an unique optical system which avoids the difficulties related to the use of multiple lens.

SUMMARY OF THE INVENTION

Briefly, the above and other objects, features and advantages of the present invention are attained in one aspect thereof by providing a process for forming, on a photosensitive surface, a composite image from a series of elemental or individual images formed successively on the screen of a cathode tube. The process includes, for each individual image, the steps of forming an elemental image on a zone of the screen, the position and dimensions of the zone of the screen being a function of the number of individual images adapted to form the composite image, the zone of the screen being homologous to the zone of a photosensitive surface where the individual image is to be positioned in the composite image, and transferring the individual image from the screen to the photosensitive surface by means of a fixed apparatus forming on the assembly thereof an image of the screen.

The above and other objects, features and advantages of the present invention are attained in another aspect thereof by providing an apparatus for forming on a photosensitive surface a composite image from a series of individual images formed successively on the screen of a cathode tube, which comprises a high definition cathode tube screen, a photosensitive surface, means for forming an individual image on a predetermined zone of the screen, and transfer means for transferring the image on the screen onto the entirety of the photosensitive surface, whereby the screen, the transfer means, and the photosensitive surface remain fixed with respect to one another during the formation of the various successive individual images.

In summary, to overcome the heretofore existing problems in multi-imagers, the process according to the invention consists, for each individual image, the steps of: forming the individual image on a zone of the screen whose position and dimension are a function of the number of individual images adapted to form the composite image, this zone being homologous to the zone of the photosensitive surface where the individual image must occur in the composite image; and transferring the individual image of the screen towards the photosensitive surface by means of a fixed apparatus forming on the entirety thereof, an image of the screen entirety.

To this end, each individual image is formed by limiting the amplitude of the horizontal and vertical sweeps of the tube to values which reduce the image formed on the screen to the dimensions of the screen zone selected, and by centering these sweeps at the location of the zone selected.

In effect, the composition on the cathode tube of the composite image by conventional "incrustation" techniques does not make it possible to achieve the desired result. In these techniques an adequate modulation of the video signal allows for the appearance of an image of small dimensions in a selected zone of the screen, generally with reduction of format; several of these reduced images can be juxtaposed to group together different views. At the moment the portion of the screen is enlarged, however, the raster defining the frame of the image in this zone will be equally enlarged, thereby causing a deterioration of the signal-to-noise ratio; consequently, the raster can be considered as noise from the point of view of the information transferred.

One method of increasing the density of information on a portion of the image is to increase the number of lines and the definition of each line. This would, however, detrimentally result in a considerable increase of the pass band if the reduction ratio of each individual image is increased to a substantial extent.

In contrast, the present invention makes it possible without loss of image definition to be limited to a value of the passing band on the order of 10–30 MHz (corresponding to a line duration of 64 microseconds), a range which is compatible with presently available video circuits.

This advantage results from the fact that the sweep no longer covers the entirety but rather a portion of the screen, the amplitude of the sweep being limited in both directions to the real dimensions of the reduced image. A continuous component added to the sweep signals makes it possible to successively position the individual images at the desired locations on the screen.

Because the signal-to-noise ratio is reduced with the magnification ratio, it is possible to diminish this ratio by uitilizing larger screens. But large screens, particularly if they are flat, pose among others, sweep linearity problems and focalization problems, which are well known in the field of trichromatic tubes for television. Large dimension screens are thus not adapted to fulfill the very rigid conditions required in professional applications, particularly medical applications, by virtue of the inherent electronic and optical physical limitation.

On the contrary, in the process according to the present invention, a tube of small dimension can be used, whose sweep can be perfectly controlled, and the non-linearities corrected. A tube of this type can be obtained from among existing tubes, in particular, tubes of high definition (on the order of 5–10 microns) utilized in aerospace or graphic arts applications.

Particularly, a tube can be utilized which includes luminophores having a narrow spectrum and low residual magnetic effect and whose wave-length of emission is adapted in an optimal fashion to the sensitivity of the film, to eliminate the losses or nonlinearities in the results of the densities which are observed with the currently available large-format tubes, even those having high definition; the film must be able, in effect, to lend itself to a very fine density analysis, and under these conditions, any nonlinearity corresponds to a loss of information.

The invention equally relates to an apparatus for implementing the process, which comprises: a cathode tube screen having high definition; a photosensitive surface; means for forming on one of the predetermined zones of the screen an individual image; means for transferring the image of the entirety of the screen onto the entirety of the photosensitive surface; where the screen, the transfer means, and the photosensitive surface remain fixed with respect to one another during the formation of the various successive elemental images.

The means for forming the individual images on the screen comprise horizontal and vertical sweep means controlled by the position and amplitude signals, which are a function of the number of the individual images adapted to form the composite image, so as to modify the format of the predetermined zone of the screen as a function of this number.

BRIEF DESCRIPTION OF THE DRAWINGS

The above and other objects, features and advantages of the present invention will be more fully apparent to those of ordinary skill in the art to which this invention pertains from the following detailed description when considered in connection with the accompanying drawings, in which like reference characters designate like or corresponding parts throughout the several views and wherein.

DETAILED DESCRIPTION OF THE INVENTION

Figure 1:
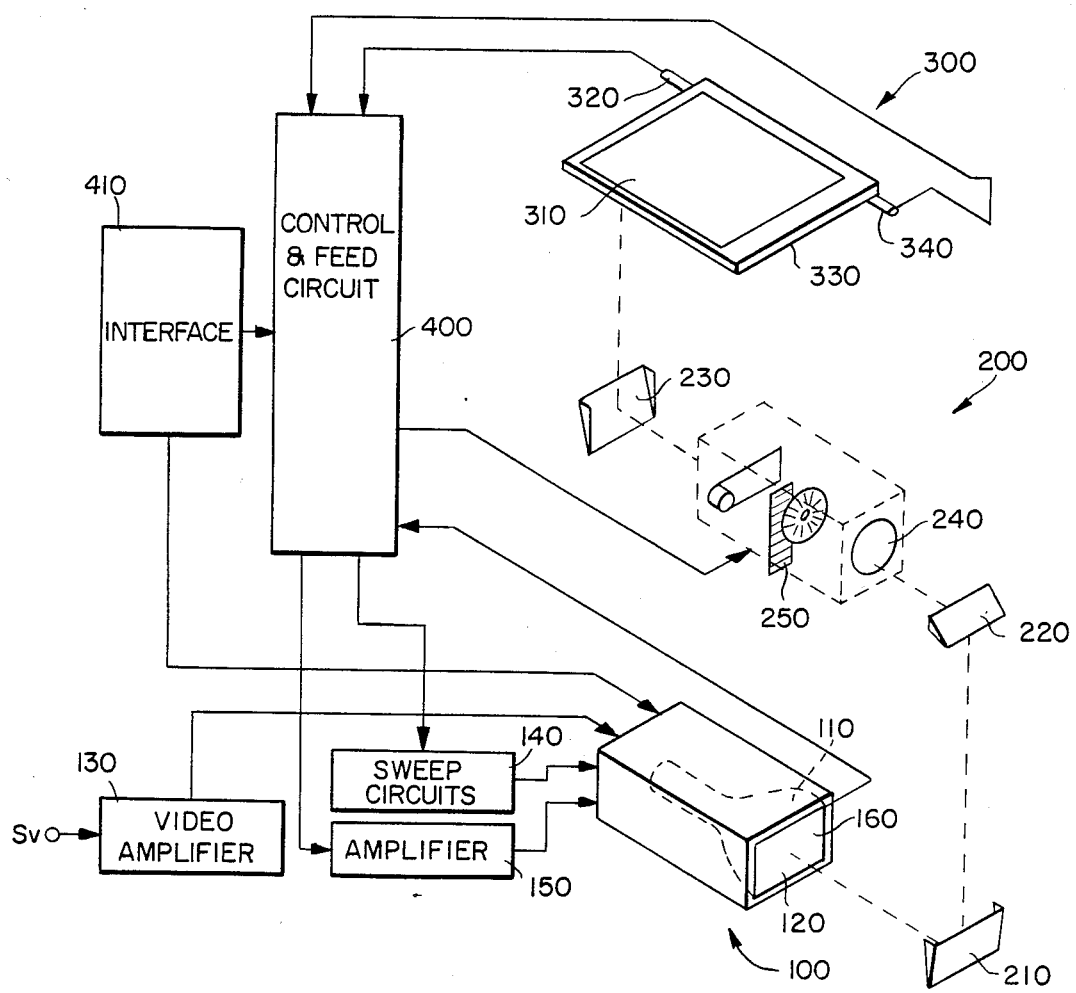
FIG. 1 is a partially pictorial block diagram of a system according to the present invention.

FIG. 1 illustrates an installation including a video monitor 100 providing a screen image which is sent back by means of an optical means 200 onto a photosensitive surface 300. A control and feed circuit 400 coordinates the operation of the various portions of the assembly; an interface 410 with an operator receives command signals and information from the operator by means of indicators.

Video monitor 100 includes a cathode ray tube 110 whose screen 120 is a flat screen of small dimensions, for example, a five inch screen (125 mm of exterior diameter with a usable diameter of 108 mm) offering a resolution on the order of 25 microns; such dimensions make it possible to obtain a definition of 3400 points on a CCIR standard image. Such a resolution, which corresponds to 20 line pairs per millimeter, is favorably comparable to the best resolution obtained presently on multi-imagers having moveable parts, a resolution on the order of 20 line pairs per centimeter. The capacity obtained with such resolution makes it possible to utilize the photosensitive film qualities to maximum benefit wherein the resolution is equal to the order of magnitude of the resolution of the image projector.

A horizontal or vertical resolution of 3400 points makes possible, for example, the composition of 16 images of 800 points of vertical or horizontal resolution each. This definition remains superior to the definition of a video image having a 625 line standard.

Tube 110 is connected to a video amplifier 130 receiving a signal at input SV. It is likewise connected to horizontal and vertical sweep circuits 140, and to a circuit 150 which magnifies the sweep path, whose structure and function will be described below.

A measurement cell 160, placed on screen 120 is connected to video amplifier 130 to allow for an automatic adjustment of the luminescence of the screen.

Optical means 200 comprises a group of mirrors 210, 220, 230, a lens 240 and a blocker 250 for controlling exposure of the film. The mirrors are not indispensable; however they make it possible to obtain a more compact assembly. To attain the previously recited performance, the lens can be a lens of 105 mm of focal length providing an opening of f/11, a linearity of 0.03%, a vignettage of 20%, and a modulation transfer function of 63% for twenty line pairs per millimeter (25 microns of resolution on the tube).

Photosensitive surface 300 comprises a cassette 310 containing the film itself, generally in an 8×10 inch format (20×25 cm) or 18×24 mm. A detector 320 connected to control circuit 400, detects the presence of this cassette. A blocking shutter 330 whose retraction is controlled by a detector 340, provides for handling safety.

FIG. 2 illustrates various possible individual image composition. FIG. 2a corresponds to a full-screen image, and FIGS. 2b-2f respectively correspond to composite images having 2, 4, 6, 9 and 16 individual images. In these figures, only the positioning of the various individual images has been shown, without taking into account the peripheral and separating margins, which are adjusted as a function of the number of images and of the height/width ratio of each individual image. In fact, this ratio can vary according to the standards used, which are not the same in scanning on the one hand, and in nuclear medicine and echo graphics on the other hand. The selected standard is indicated by the operator prior to the registration of the images.

As a function of this last information and of the number of the images selected, the apparatus determines the amplitude of the sweeps as well as the positioning of each image. These parameters can be recorded, for example, preliminarily in programmable semiconductor memories, the entirety being controlled, in a conventional manner, by a microprocessor. Numeric/analog converters transform the corresponding parameters into sweep signals which can be used immediately.

Figure 2A:
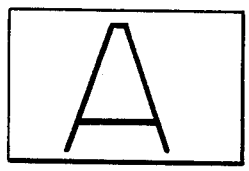
FIGS. 2a–2f illustrate various composite images which can be obtained through the process of the invention.
Figure 2B:
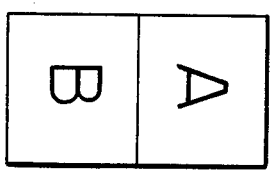
Figure 2C:
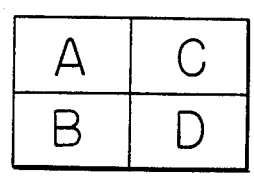
Figure 2D:
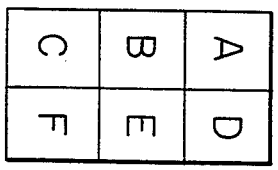
Figure 2E:
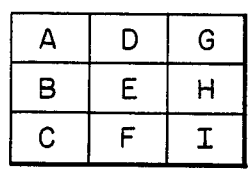
Figure 2F:
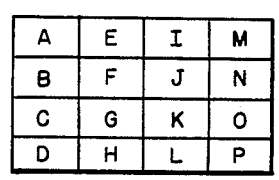

It should be noted that, in the case of FIGS. 2b and 2d (2 and 6 images, respectively) it can be necessary to permutate the horizontal and vertical sweeps in order to use the maximum usable surface of the film. For reasons of clarity, it will be understood from what follows by making an abstraction of this permutation, it being understood that the terms "horizontal" and "vertical" have only a relative meaning.

Likewise, the sequence in which the various successive individual images will be formed can be memorized, for example, column-by-column or line-by-line. This order of succession can likewise be imposed by the operator; in the latter case, means are provided for preventing the formation on the screen of an individual image on a zone where another elemental image intended for the same composite image has already been formed, this, so as to prevent any double-exposure on the film.

Figure 3:
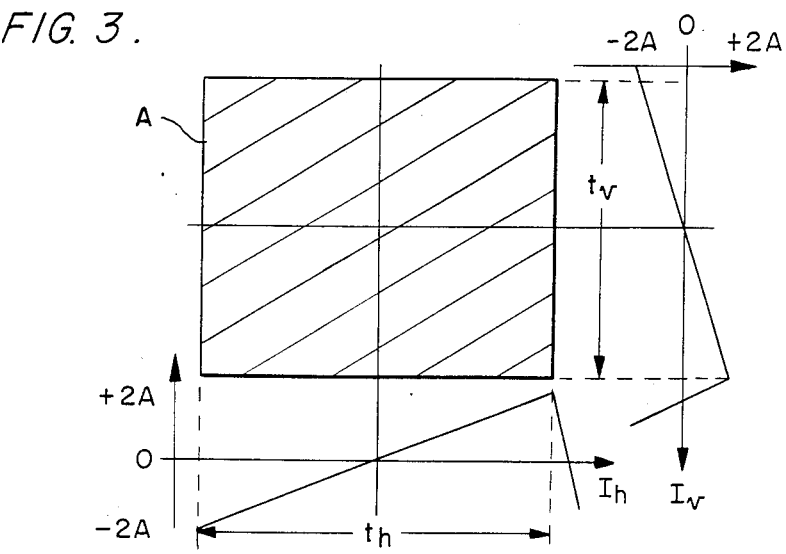
FIGS. 3 and 4 respectively illustrate for one full-screen and one quarter-screen image the form of the horizontal and vertical deviation signals generated.
Figure 4:
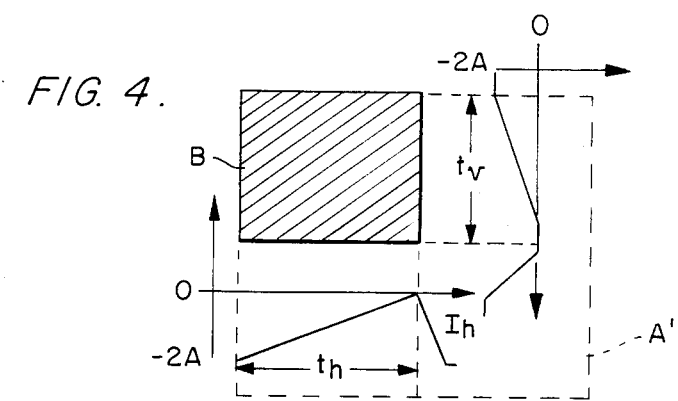

FIGS. 3 and 4 illustrate the appearance of the sweep signals, for example, of the currents $I_h$ and $I_v$ if the tube has electromagnetic deviation.

For a full-screen sweep A (FIG. 3), assuming that the horizontal and vertical deviation currents vary between −2 amperes and +2 amperes, the duration of a line is $t_h$, and the duration of a raster is $t_v$.

For a sweep of a quarter-screen B (FIG. 4, line A' illustrates the full screen), to sweep the upper left hand corner B, the horizontal deviation current would vary between −2 amperes and 0.0 amperes, and the vertical deviation current would be varied between −2 amperes and 0.0 amperes. Then, to sweep, for example the lower left hand corner, the horizontal deviation current would be varied between −2 amperes and 0.0 amperes, but the vertical deviation current would be varied between 0.0 and +2 amperes. The same method would be used for the two remaining zones of the screen, changing that which must be changed to correspond to the particular zone being swept.

It is important to note that line and raster durations $t_h$ and $t_v$ remain identical to the case of the proceeding figure (full screen). This permits preserving the quantity of information, without increasing the passing band, while nevertheless reducing the format.

Figure 5:
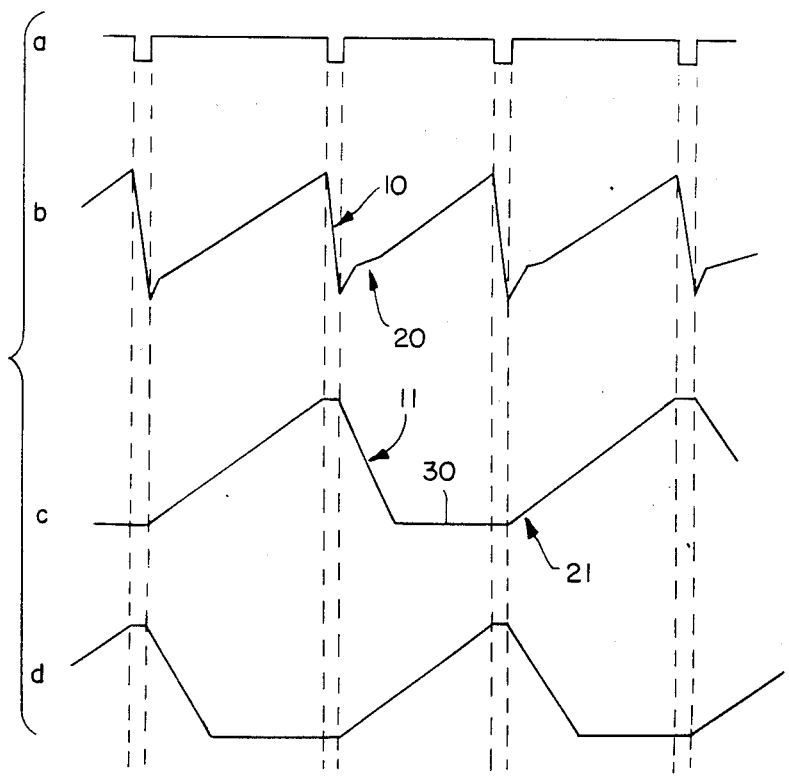
FIG. 5 illustrates a manner in which interlaced scanning of the lines is achieved.

It is preferable that the screen sweeps are performed by interlacing of the even and odd lines, the return of the spot occuring during the time interval between the sweep of two successive lines having the same parity. In effect, with a conventional sweep such as that shown in FIG. 5b (FIG. 5a corresponds to synchronization signals), the sawtooth shows a descending face 10 which is very steep. This face, which corresponds to the return spot, is not in itself disturbing because the spot is erased during the duration of the return, but it will cause a following nonlinearity 20 of the sawtooth, i.e., at the edge of the screen. This nonlinearity will be very troublesome for the application being considered as any variation in sweep velocity creates a variation of the same order as in light emitted. Furthermore, when the tube utilized is a tube having electromagnetic deviation where one must pass from −2 to +2 amperes in a reel with voltage on the order of 100 volts in a duration of less than 8 microseconds, it is very difficult to find a stable state for a system which undergoes disturbance fluctuations of less than 2% of the base current variation. To resolve this difficulty, the invention proposes to interlace the lines, i.e., to jump one line over two by first sweeping the even lines (FIG. 5a) and then the odd lines (5d). The image complements itself from one raster to the other by virtue of the fact that there is always an odd number of lines. Between two sawteeth, a slow return 11 of the spot can be used, followed by a waiting period 30 of the impulse synchronization. As the spot is immobile at the moment of its start, it is possible to obtain a perfectly linear beginning of sawtooth 21.

This method increases fluttering when the video monitor is observed but the fluttering is not visible on a photograph; this problem is avoided simply by doubling the exposure time.

Figure 6:
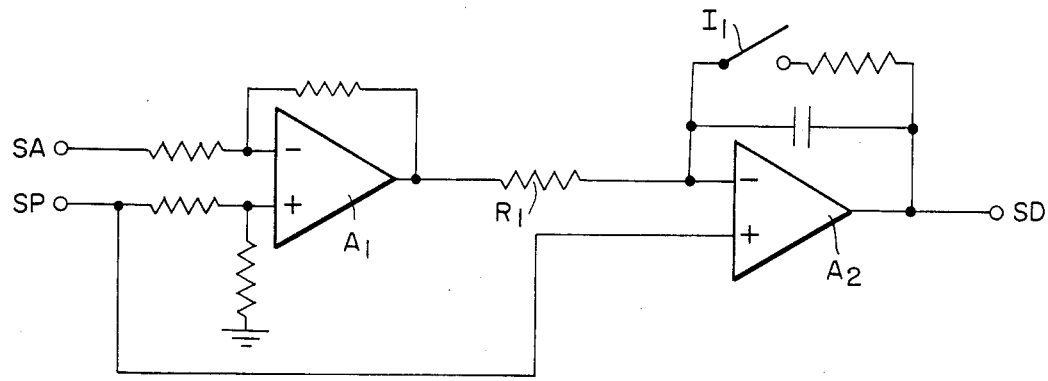
FIG. 6 is an electronic schematic diagram of a sweep signal generator circuit.
Figure 7:
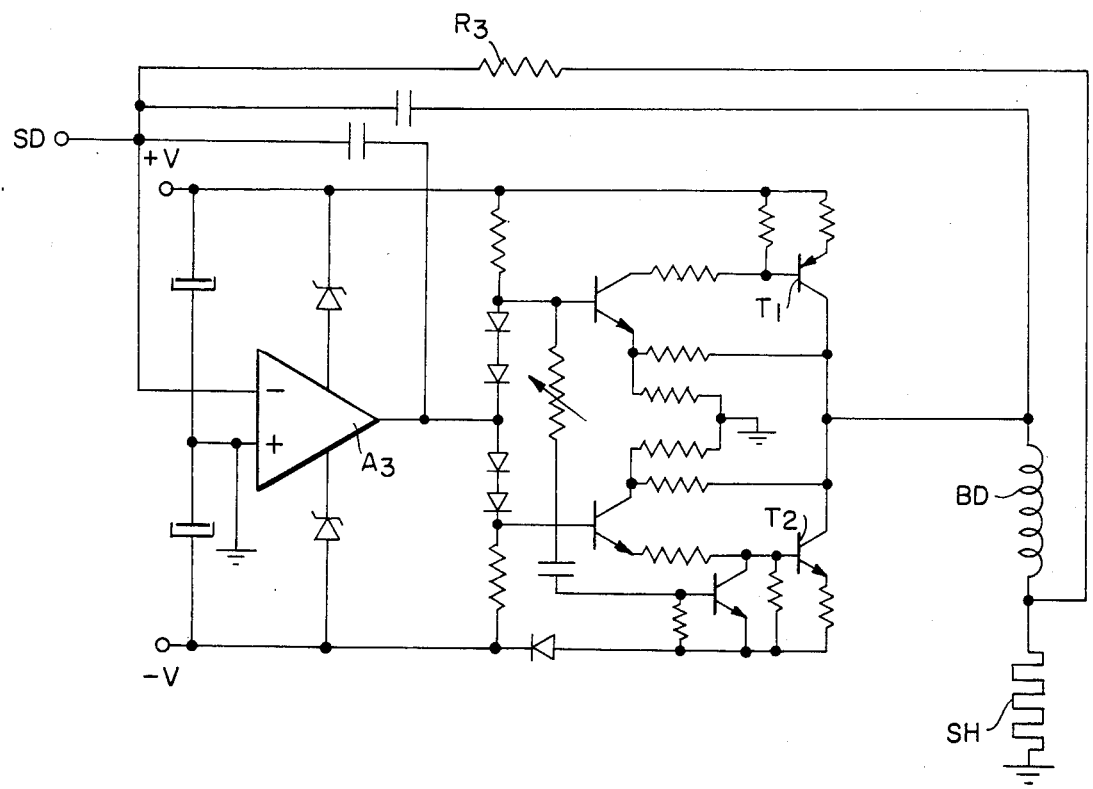
FIG. 7 is an electronic schematic diagram of a sweep amplifier.

Sweep circuits 140 (FIG. 1) comprise, for each of the horizontal and vertical sweeps, a deviation signal generator such as that shown in FIG. 6, connected to a deviation amplifier such as that shown in FIG. 7.

The deflection signal generator (FIG. 6) receives an amplitude signal at its input SA and a position signal at its input SP; these two signals issue from numeric-/analog converters run by programmable memories, as has been indicated above. The deflection signal generator delivers at the output, on terminal SD, a sawtooth voltage depending directly upon the two parameters of position and amplitude. The sawtooth generator has an integrator stage having operational amplifier A2, whose non-inverting input is connected to terminal SP, which determines the point of departure of the sawtooth, after closure of switch $I_1$. A second operational amplifier $A_1$ makes it possible to bring back the voltage to the resistance $R_1$, which corresponds to the amplitude, to a value which takes into account position signal SP.

The signal thus delivered at the output of the circuit of FIG. 6 is applied (FIG. 7) to the input of a sweep amplifier. The base element is an operational amplifier A3 having a high input impedance and a very high sweep velocity, followed by a buffer stage comprising high power complementary transistors $T_1$ and $T_2$ which permit a direct coupling with the deflection coil BD. A shunt resistance $R_3$ positioned in series with this coil makes it possible to reinject a voltage proportional to the deviation current at the inverting input pot of amplifier A3. Thus, the deviation current exactly follows the command information SD applied to the input.

This dynamic correction of the sweep current allows for a very high dimensional stability of the image and assures an excellent repetition of the results.

Figure 8:
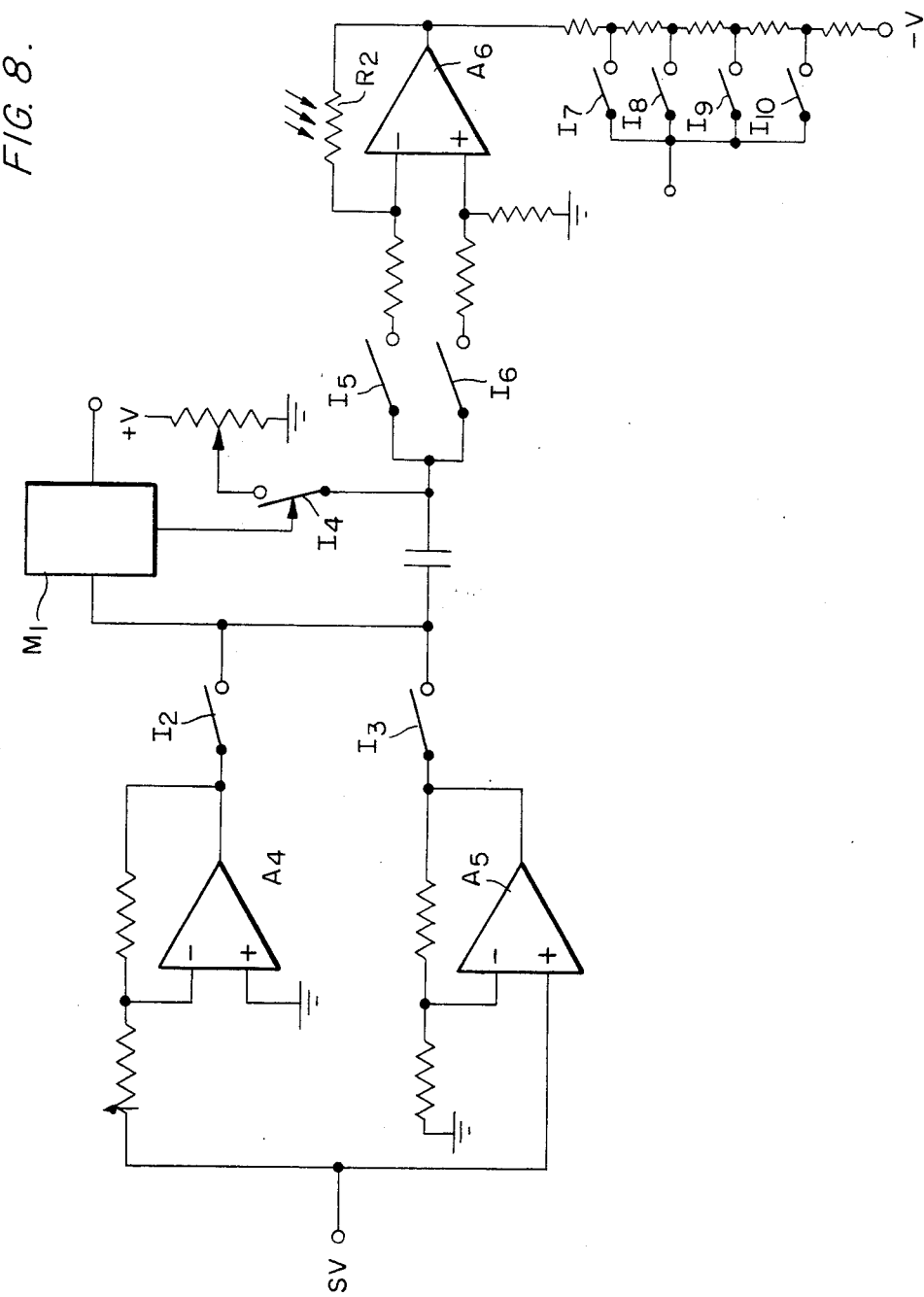
FIG. 8 is an electronic schematic diagram of a video signal amplifier.

FIG. 8 schematically represents video amplifier 130 (shown in FIG. 1). Operational amplifiers A4 and A5 operate in parallel and switches I2 and I3 are controlled in such a way as to have positive synchronization pulses. A monostable M1 makes it possible to superimpose on the signal for a brief duration, a predetermined positive voltage by control of switch I4. This voltage space makes it possible to calibrate amplifier A6 for a given black level.

Switches I5 and I6 make it possible to select a normal or inverted image. Switches I7 through I10 which are automatically controlled, make it possible to adjust the video level as a function of the format of the elemental image. The more the sweep surface is reduced, the more the image becomes brilliant; it is necessary to compensate for these variations to obtain a uniform exposure of the film, independently of the format.

The power ratio of amplifier A6 is likewise controlled by photoresistor R2 whose value is subjected to the light of the tube.

Preferably, it is the grid of the cathode tube 110 which receives the video signal, and not the cathode, in a manner so as to maintain a constant value of the very high voltage regardless of the signal; this makes it possible to preserve the sweep amplitude independently from the polarization of the tube, and to maintain the focalization independently from the quantity of light emitted. The erasing signals of the spot when the sweep returns will thus be applied to the cathode.

Lastly, the role of sweep magnification circuit 150 will be described with reference to FIG. 1. It has been observed that a screen having very high definition (being able to give more than 3,000 sweep lines) poses a problem as soon as it is used to reproduce an unique full-screen image, with approximately 600 lines. If the system is not an interlineated system, a raster will cover approximately 300 lines. In this latter case, the surface covered by the luminescent sweep is less than one-tenth of the interline, i.e., sweeps of 25 microns will be spaced by indistinct zones of 250 microns. This phenomenon diminishes the visibility of the image to a substantial extent.

To overcome this disadvantage (without defocalizing the spot, an event which would result in a loss of definition), means are provided to increase the surface covered by the luminescent spot in such a way as to obtain in a vertical direction a broadened coverage of the screen over the entire space included between two successive lines.

In a first embodiment of a circuit for providing a broader coverage, an additional vertical high-frequency oscillator is used which generates a signal whose amplitude allows for the complementary deviation on the height included between two lines. The amplitude of oscillation is zero in the horizontal direction which makes it possible to preserve the initial definition in this direction. The height deviation is adjusted such that two successive sweeps on the screen and thus on the film, come in contact without penetrating into one another. The amplitude of the oscillations is adjusted for each format, but it is necessary to provide a second oscillator for formats necessitating a permutation of horizontal and vertical sweeps (the case of FIGS. 2b and 2d).

In another preferred embodiment, each raster is vertically shifted by a fraction of the interlying space, in a cyclical fashion, by adding a complementary signal which is constant for each raster to the vertical deviation signal. In this way an additional deflection of low amplitude is created which allows, for example, the system to cover eight times over the entire width of the interline, by virtue of one-eighth of the interline for each group of four rasters. The complementary deflection signals can be stored in memory for each format in the programmable memories at the same time as the various position and amplitude sweep parameters.

Of course, the present description respresents only one example of an embodiment of the invention, and the invention is of course not limited to the embodiment specifically disclosed, but extends to all equivalents falling within the scope of the claims. Thus, from the foregoing description, one skilled in the art can easily ascertain the essential characteristics of this invention and, without departing from the spirit and scope thereof, can make various changes and modifications of the invention to adapt it to various usages and conditions.

We claim:

1. A process for forming, on a photosensitive surface, a composite image from a series of individual images formed successively on the screen of a cathode ray tube, comprising, for each individual image, the steps of:

(a) forming an individual image on a zone of the screen, the position and dimensions of said zone of said screen being a function of the number of individual images adapted to form a composite image, said zone of said screen being homologous to the zone of the photosensitive surface where said individual image is to be positioned in said composite image;

(b) transferring said individual image from said screen to said photosensitive surface by means of a fixed apparatus forming on the assembly thereof an image of said screen, (c) limiting the horizontal and vertical sweep amplitudes of said tube to values which reduce the size of the image formed on said screen to the dimensions of a selected screen zone, and (d) positioning said image by centering said sweeps at the position homologous to said selected zone.

2. Apparatus for recording on a photosensitive surface a composite image from a series of elemental images formed successively on the screen of cathode ray tube: said apparatus comprising:
  (a) a high definition cathode ray tube screen;
  (b) a photosensitive surface;
  (c) means for forming individual images on predetermined zones of said screen;
  (d) said last named means including:
    (1) means for determining the position of each of said pre-determined zones as a function of the number of individual images used to form said composite image, and
    (2) horizontal and vertical sweep means controlled by position signals and amplitude signals, both said position and amplitude signals varying as a function of the number of the individual images used to form the composite image, so as to modify the format of the predetermined screen zone as a function of this number,
  (e) said predetermined screen zone corresponding to the zones of said photosensitive surface in which said individual images are positioned in said composite image; and
  (f) transfer means for transferring said individual image on said screen onto the entirety of said photosensitive surface; whereby said screen, transfer means, said photosensitive surface remain fixed with respect to one another during the formation of various successive individual images.

3. The apparatus according to claim 2 wherein said position signals and said amplitude signals are furnished by numeric/analog converters controlled by memory means containing position and amplitude parameters corresponding to each individual image, both said position and said amplitude parameters varying as a function of the number of the individual images, of their order of succession and of their format.

4. The apparatus according to claim 2 further comprising means for preventing the formation on said screen of an individual image on a zone on which has been recorded previously another individual image adapted to the same composite image.

5. The apparatus according to claim 4 wherein the sweeps associated with said screen are performed with interlacing of the even and odd lines, the return of the spot associated with said sweeps occurring in the time interval included between the sweep of two successive lines having the same parity.

6. The apparatus according to claim 5 further comprising means for increasing the surface covered by the luminescent spot associated with the cathode tube so as to obtain, in a vertical direction, a coverage of said screen over the entire space located between two successive lines.

7. The apparatus according to claim 6 wherein said means for increasing the surface covered by said luminescent spot comprises a vertical high-frequency oscillator generating a signal having an amplitude allowing for the complementary deviation of said spot on the height located between two successive lines.

8. The apparatus according to claim 6 wherein said means for increasing the surface covered by said luminescent spot comprises means for vertically shifting each raster associated with said cathode tube by a fraction of the space separating two successive lines, in a cyclical manner, by adding a complementary signal which is constant for each raster to the vertical deviation signal associated with said raster.

9. The apparatus according to claim 8 wherein a video signal is applied to the grid of said cathode tube, and a line erasure signal and a raster signal are applied to the cathode.

10. The apparatus according to claim 9 wherein said tube is an electromagnetic deviation tube, and further comprising a sweep amplifier comprising a current amplifier having counter reaction.

11. The apparatus according to claim 10 further comprising automatic control means having a video signal whose intensity varies as a function of the format of said elemental images.

12. The apparatus according to claim 9 wherein said tube is an electromagnetic focalization tube.

* * * * *